US012555732B2

(12) United States Patent
Naumowicz et al.

(10) Patent No.: US 12,555,732 B2
(45) Date of Patent: Feb. 17, 2026

(54) ELECTROMECHANICAL ROTARY LATCH FOR USE IN CURRENT INTERRUPTION DEVICES

(71) Applicant: SENSATA TECHNOLOGIES, INC., Attleboro, MA (US)

(72) Inventors: Samuel C. Naumowicz, Scottsdale, AZ (US); Kenny H. Chui, Oxnard, CA (US); Keith A. Singer, Hardy, VA (US); Joseph A. R. Stephens, Santa Barbara, CA (US)

(73) Assignee: SENSATA TECHNOLOGIES, INC., Attleboro, MA (US)

(*) Notice: Subject to any disclaimer, the term of this patent is extended or adjusted under 35 U.S.C. 154(b) by 661 days.

(21) Appl. No.: 17/724,558

(22) Filed: Apr. 20, 2022

(65) Prior Publication Data

US 2023/0343538 A1 Oct. 26, 2023

(51) Int. Cl.
*H01H 71/10* (2006.01)
*H01H 71/08* (2006.01)

(52) U.S. Cl.
CPC ........ *H01H 71/1009* (2013.01); *H01H 71/08* (2013.01)

(58) Field of Classification Search
CPC ........ H01H 71/08
USPC ........ 335/15, 16, 147, 195; 218/22
See application file for complete search history.

(56) References Cited

U.S. PATENT DOCUMENTS 837,854 A * 12/1906 Larson ........ H01F 7/12 335/247
2,365,602 A * 12/1944 Slepian ........ H01H 33/92 218/112
2,540,491 A * 2/1951 Rowe ........ H01H 73/50 218/147
4,725,801 A * 2/1988 Snyder ........ H01H 51/084 335/125
5,047,740 A * 9/1991 Alman ........ H01H 50/646 335/4
5,109,146 A * 4/1992 Maenishi ........ H01H 9/443 335/201
5,300,905 A * 4/1994 Kolbas ........ H01H 3/022 335/167

(Continued)

FOREIGN PATENT DOCUMENTS

AT 243354 B 11/1965
EP 1079408 A2 2/2001

OTHER PUBLICATIONS

International Search Report and Written Opinion, PCT/US2023/018221, Sep. 4, 2023, 16 pages.

*Primary Examiner* — Alexander Talpalatski
(74) *Attorney, Agent, or Firm* — Mark H. Williams

(57) ABSTRACT

An electromechanical rotary latch for use in current interruption devices disclosed. In a particular embodiment, a fuse device comprises a rotary latch; a rotatable armature configured to actuate the rotary latch; and a contact configured to change between a set position that allows current flow through the fuse device and a triggered position which interrupts current flow through the fuse device; wherein the fuse device is configured such that when a threshold current level passes through the fuse device, the rotatable armature changes configuration in response to a generated electromagnetic field, which actuates the rotary latch causing the contact to transition to the triggered position.

16 Claims, 9 Drawing Sheets

(56) References Cited

U.S. PATENT DOCUMENTS

| | | | | |
|---|---|---|---|---|
| 5,825,269 | A * | 10/1998 | Koppmann | H01H 9/345 335/132 |
| 6,229,421 | B1 * | 5/2001 | Floyd | H01F 7/1607 335/229 |
| 6,922,121 | B2 * | 7/2005 | Kim | H01F 7/124 335/253 |
| 7,724,112 | B2 * | 5/2010 | Kerr | H01H 27/007 200/50.01 |
| 7,978,036 | B2 * | 7/2011 | Adunka | H01H 1/0015 335/8 |
| 8,169,280 | B2 * | 5/2012 | Saruwatari | H01H 50/04 335/78 |
| 8,907,753 | B2 * | 12/2014 | Willburger | H01F 7/145 335/272 |
| 9,887,055 | B2 | 2/2018 | McTigue et al. | |
| 2003/0034864 | A1 | 2/2003 | Castonguay et al. | |
| 2011/0187483 | A1 * | 8/2011 | Willburger | H02K 37/125 335/230 |
| 2013/0278362 | A1 * | 10/2013 | Iwamoto | H01H 1/26 335/78 |
| 2019/0198277 | A1 * | 6/2019 | Mctigue | H01H 71/08 |

* cited by examiner

ELECTROMECHANICAL ROTARY LATCH FOR USE IN CURRENT INTERRUPTION DEVICES

BACKGROUND

In the field of electronics and electrical engineering, various devices can be employed in order to provide overcurrent protection, which can thus prevent short circuits, overloading, and permanent damage to an electrical system or a connected electrical device. Two of these devices include fuses and circuit breakers. With recent advances in electric vehicles, overcurrent protection is particularly applicable to prevent device malfunction and permanent damage to the devices. Furthermore, overcurrent protection can prevent safety hazards, such as electrical fires.

Traditional thermal fuses use a heated element for current sensing that melts when a specified current is reached. This approach scales poorly for high-performance applications like electric vehicles, with thermal fuses having high electrical resistance and experiencing thermal fatigue over life. Thermal fuses also interrupt the flow of current too slowly in some applications.

Electronic and electromechanical fuses have been developed to overcome the short-comings of thermal fuses. For example, such fuses do not require heating for current sensing and achieve current sensing via electromechanical latching mechanisms or electronic sensors and integrated circuits. Such fuses may suffer from complex failure modes associated with the use of electronic sensors and integrated circuits or from sensitivity to external shock and vibration that can cause premature failure due to environmental conditions.

In some cases, there may be a dependent relationship between a minimum trigger current and compliance with shock and vibration specifications. For example, in an electromechanical application, springs must apply enough force to prevent premature movement of a linear latching mechanism and these forces must then be overcome by a comparatively high minimum current for the fuse to trigger. This means a customer that requires high shock must also accept a high minimum trigger current and conversely a customer that requires a low minimum trigger current must also accept low shock compliance.

SUMMARY

Embodiments in accordance with the present disclosure are directed to an electromechanical rotary latch for use in current interruption devices. These embodiments utilize a rotational electromechanical latching mechanism that is balanced about the axis of rotation, thus preventing external shock and vibration from exerting any force on the mechanism. The rotational mechanism does not suffer from the environmental failure modes associated with linear latching mechanisms or electronic sensors. The balanced rotational mechanism eliminates the relationship between minimum trigger current and compliance with shock and vibration specifications, allowing these parameters to be chosen independently. When a threshold current level is reached, an induced electromagnetic field causes the rotation of an armature to a point where a rotary latch is actuated, thus transitioning a circuit to an interrupted state. In such an assembly, the center of mass of the unlatching mechanism is located along the axis of rotation creating an evenly balanced assembly, which causes external forces to produce no net moment. Thus, the device can be configured with a lower trigger current without concern for external shock forces.

A particular embodiment is directed to a fuse device utilizing an electromechanical rotary latch. The fuse device includes a rotary latch, a rotatable armature configured to actuate the rotary latch, and a contact configured to change between a set position that allows current flow through the fuse device and a triggered position which interrupts current flow through the fuse device. The fuse device is configured such that when a threshold current level passes through the fuse device, the rotatable armature changes configuration in response to a generated electromagnetic field, which actuates the rotary latch causing the contact to transition to the triggered position. In some examples, the contact is biased toward the triggered position, and the rotary latch holds the contact in the set position. In some examples, the contact is supported by a shaft, and the shaft is latched by the rotary latch to hold the contact in the set position. In some examples, the rotary latch includes one or more cams that engage a notch in the shaft in a latched state, and wherein rotation of the rotatable armature causes the one or more cams to disengage the shaft. In some examples, the one or more cams are biased against the shaft by one or more torsion springs. In some examples, the armature includes one or more protrusions that engage the one or more cams. In some examples, the contact is biased toward the triggered position by a contact spring. In some examples, the contact is accelerated toward the triggered position by a latch spring in an unlatched state. In some examples, the rotatable armature is biased from actuating the rotary latch below the threshold current level.

Another particular embodiment is directed to an apparatus utilizing an electromechanical rotary latch. The apparatus includes one or more cores disposed within a housing, one or more fixed contacts disposed proximate to the one or more cores, and a movable contact configured to contact the one or more fixed contacts in an untriggered state. The apparatus further includes a rotatable armature disposed proximate to the one or more cores, where the armature is biased such that the armature and the one or more cores are separated by a gap. The rotatable armature is configured to rotate toward the one or more cores in response to a magnetic field induced by an electric current in the one or more fixed contacts. The rotation of the armature triggers the movable contact to change position such that contact with the one or more fixed contacts is broken. In some examples, the rotatable armature is biased by a mechanical resistance structure configured to maintain the gap until a threshold current level passes through the one or more fixed contacts. In some examples, the movable contact is biased toward a triggered position, and a rotary latch holds the contact in an untriggered position in contact with the one or more fixed contacts. In some examples, the movable contact is acted upon by a shaft, and wherein the shaft is latched by the rotary latch when the movable contact is in the untriggered position. In some examples, the rotary latch includes one or more cams that engage a notch in the shaft in a latched state, and rotation of the rotatable armature causes the one or more cams to disengage the shaft. In some examples, the one or more cams are biased against the shaft by one or more torsion springs. In some examples, the armature includes one or more protrusions that engage the one or more cams. In some examples, the movable contact is biased toward the triggered position by a contact spring. In some examples, the movable contact is accelerated toward the triggered position by a latch spring in an unlatched state.

Another particular embodiment is directed to a method of using an electromechanical rotary latch in current interruption devices. The method includes connecting one or more stationary contacts of a fuse device to an electric circuit. The fuse device includes a rotary latch; a rotatable armature configured to actuate the rotary latch; and a contact configured to transition, in response to actuation of the rotary latch, between a set position that allows current flow through the fuse device and a triggered position which interrupts current flow through the fuse device. The method also includes applying an electric current in the electric circuit that exceeds a threshold electric current level, where the electric current induces a magnetic field causing the armature to actuate the rotary latch thereby interrupting the electric circuit. In some examples, the contact is biased toward the triggered position, and the rotary latch holds the contact in the set position.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1A:
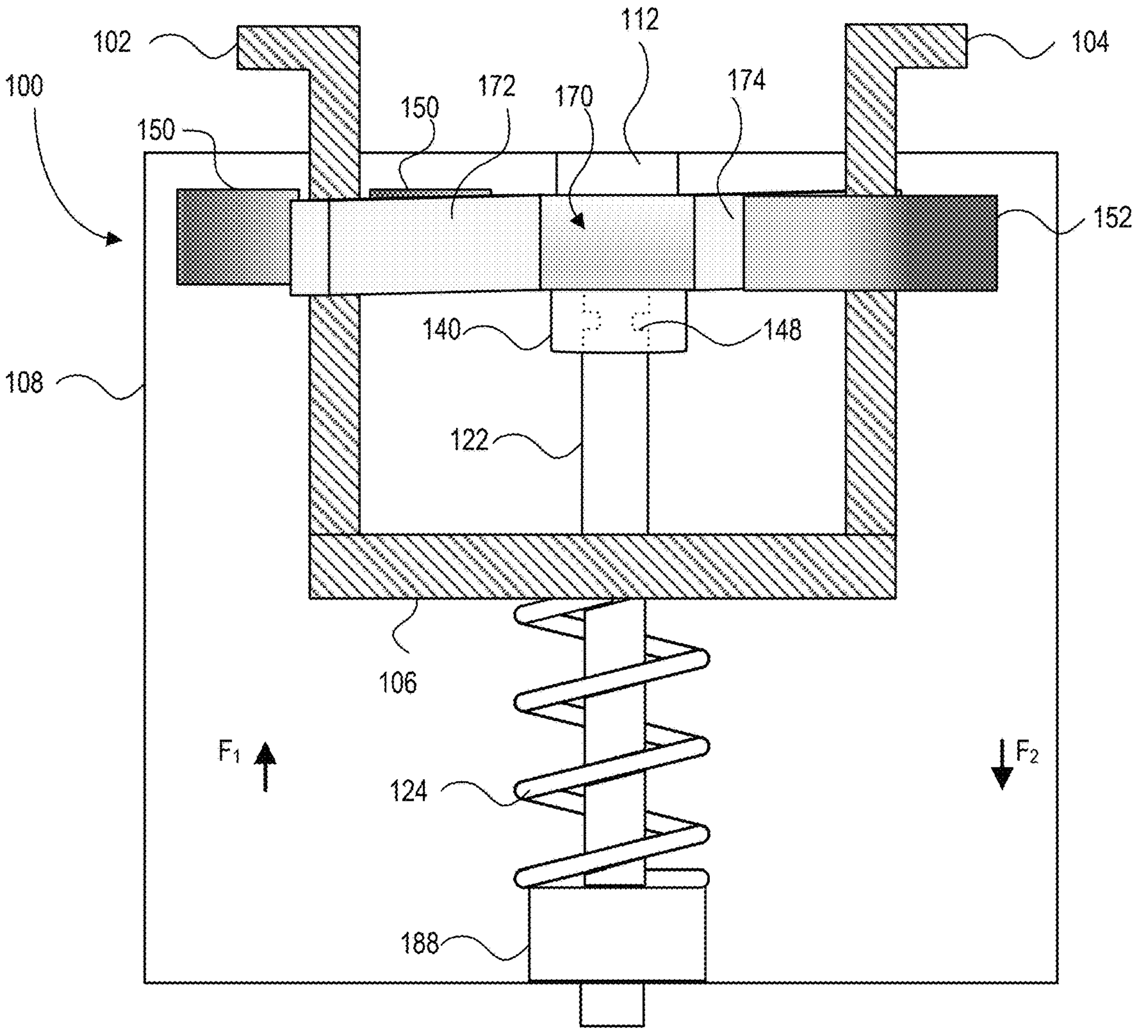
FIG. 1A sets forth a front view of an example device utilizing an electromechanical latch for current interruption in accordance with some embodiments of the present disclosure, the device being in an untriggered state.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1B:
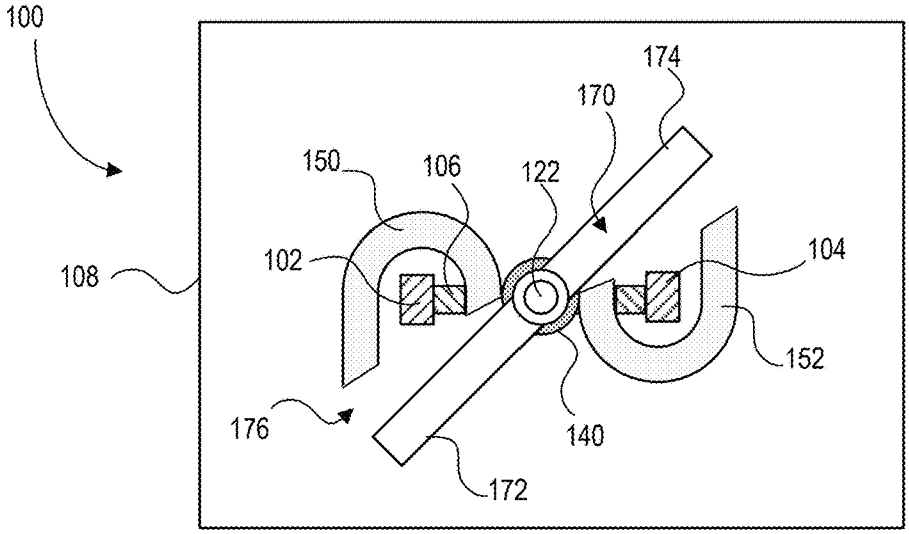
FIG. 1B sets forth atop view of the device of FIG. 1A.

Exemplary apparatuses, systems, and methods for electromechanical rotary latch for use in current interruption devices in accordance with the present disclosure are described with reference to the accompanying drawings, beginning with FIG. 1A and FIG. 1B. FIG. 1A depicts a font view of an example fuse device 100 in accordance with some embodiments of the present disclosure and FIG. 1B depicts an overhead view of the example fuse device 100 in accordance with some embodiments of the present disclosure. As mentioned previously herein, fuse devices incorporating features of the present disclosure can comprise mechanical features for setting and triggering the fuse device. In the examples shown in FIG. 1A and FIG. 1B, the fuse device 100 is shown in its non-triggered or "set" mechanical orientation. The various non-triggered and triggered orientations will become more apparent as the various drawings are explained in greater detail.

In some embodiments, the fuse device 100 includes a housing 108 having an interior compartment 110. The housing 108 supports fixed contacts 102, 104 that disposed partially within the compartment 110 and partially exterior to the housing 108 such that the fuse device 100 may be connected to an electric circuit. The fixed contacts 102, 104 can comprise a conductive material such as copper or other suitable conductive metal or structure. The first and second fixed contacts 102, 104 can be configured such that there is electrical isolation between them, for example, the contacts 102, 104 can be separated by an electrically insulating material or simply by an electrically isolating spatial gap. In some embodiments, where the housing 108 is hermetically sealed, under vacuum conditions and/or filled with an electronegative gas, potential electrical arcing between the fixed contacts 102, 104 can be further reduced or prevented, resulting in further electrical isolation.

The fuse device 100 further includes a movable contact 106 disposed within the compartment 110 of the housing 108. When the fuse device 100 is in its set position, the movable contact 106 can be connected to both of the electrically isolated fixed contacts 102, 104, such that the movable contact 106 functions as a bridge allowing an electrical signal to flow through the device, for example, from the first fixed contact 102, to the movable contact 106, to the second fixed contact 104, and vice versa. Accordingly, the fuse device 100 can be connected to an electrical circuit, system or device and complete a circuit while in its set position and when the movable contact is in electrical contact with the fixed contacts.

In some embodiments, the movable contact 106 is positioned around and coupled to a shaft 122. One end of the shaft 122 is engaged by a rotary latch assembly 140, which retains the shaft 122 in the set position holding the movable contact 106 against the fixed contacts 102, 104. In one example, the shaft 122 includes a notched portion 148 that is engaged by the rotary latch assembly 140. Examples of the rotary latch assembly 140 are provided in greater detail below. While the shaft 122 is engaged by the rotary latch assembly 140, holding the movable contact in contact with the fixed contacts 102, 104, the movable contact 106 is also biased away from the fixed contacts 102, 104 by a force provided by first bias member 124. In one example, the first bias member 124 is a spring that exerts bias force F2 on the shaft 122 and/or the movable contact 106. For example, the first bias member 124 may be a coil spring or a wave spring. Readers of skill in the art will appreciate that other types of mechanical structures, or additional mechanical structures, not identified here may be used to provide the bias force F2. In the set position, the retention of the shaft 122 by the rotary latch assembly 140 creates potential energy in the first bias member 124. When the rotary latch assembly 140 releases the shaft 122, the potential energy in the first bias member is released and the bias force provided by the bias member 124 moves the movable contact 106 out of contact with the fixed contacts 102, 104 toward, for example, a fixed member 188 supporting the bias member 124. In one example, the first bias member 124 is coupled to the movable contact 106 and/or the shaft 122 thereby exerting the bias force.

The fuse device 100 further includes a two metal cores 150, 152 composed of iron or other suitable metal or alloy capable of producing a magnetic field in the presence of an electric current. In some examples, the cores 150, 152 are "U" shaped, such that the fixed contacts 102, 104 pass through (without touching) the cores 150, 152. As illustrated in the example shown in FIG. 1B, the cores 150 in this example are U-shaped. In the presence of an electric current flowing through the fixed contacts 102, 104, the cores 150, 152 function as an electromagnet. In some examples, the cores 150, 152 are supported by the housing 108.

The fuse device 100 further includes a rotatable armature 170. In some examples, the rotatable armature 170 includes a center aperture that can receive a shaft 122. In some implementations, the armature includes a first arm 172 and a second arm 174, such that the arms 170, 172 are rotatable into contact with the cores 150, 152, respectively. In some examples, the armature 170 is composed of a ferromagnetic metal or metal alloy, such as iron, steel, nickel, and the like. When the fuse device 100 is in the set orientation, or untriggered state, a mechanical gap 176 is maintained between the arms 172, 174 of the armature 170 and the cores 150, 152. The armature 170 can be held in the set orientation by various structures, for example, mechanical structures such as a mechanical resistance structure 112. In one embodiment, the mechanical resistance structure 112 is a torsion spring that is configured to hold the armature 170 in the set position, thus maintaining the gap 102, until the device is triggered. In other embodiments, the mechanical resistance structure is a gear assembly. In still other embodiments, the mechanical resistance 112 structure is not utilized and the armature 170 is configured to be held in a set position by other means.

The fuse device 100 can be configured such that triggering the fuse device 100 by reaching a predetermined threshold current level will generate an electromagnetic field sufficient to overcome the force provided by the mechanical resistance structure 112 (or another mechanical structure holding the device in a non-triggered position) and trigger the device. The cores 150, 152, the armature 170, and the mechanical resistance structure 112 and/or the various other components of the fuse device 100 can be configured such that when the current through the device reaches a certain predetermined current level, for example, 800 amps, the cores 150, 152 will generate a sufficient magnetic field to cause the armature 170 to overcome the force of the mechanical resistance structure 112 and trigger the device.

Once a sufficient electromagnetic force is generated due to the pre-determined current value being reached, the fuse device 100 transitions from its set position, wherein the fuse device allows electrical flow through it, to the triggered position, wherein the electrical device breaks the connected circuit. In the embodiment shown, this transition between positions occurs when the generated electromagnetic field causes the arms 172, 174 to become drawn toward the cores 150, 152, for example, to a degree that overcomes the force applied by the mechanical resistance structure 112. This at least partially reduces (and can totally eliminate) the mechanical position gap 176 by rotation of the armature 170, which actuates the rotary latch assembly 140 to disengage and release the shaft 122. This causes the movable contact

106 to no longer be restrained, which allows the first bias member 124 to react on the shaft 122, which causes the movable contact 106 to change orientation out of contact with the fixed contacts 102, 104 within the fuse device 100 and break the circuit.

It will be appreciated that the center of mass of the unlatching mechanism is located along the axis of rotation creating an evenly balanced assembly, which causes external forces to produce no net moment. Any force applied to this assembly will produce a net moment of zero, since moments can only be produced where there is a perpendicular force vector away from the center of mass on the armature. Since the center of mass of both the armature and shaft are aligned, there is no possible moment to induce rotation from a shock or vibration.

Figure 2A:
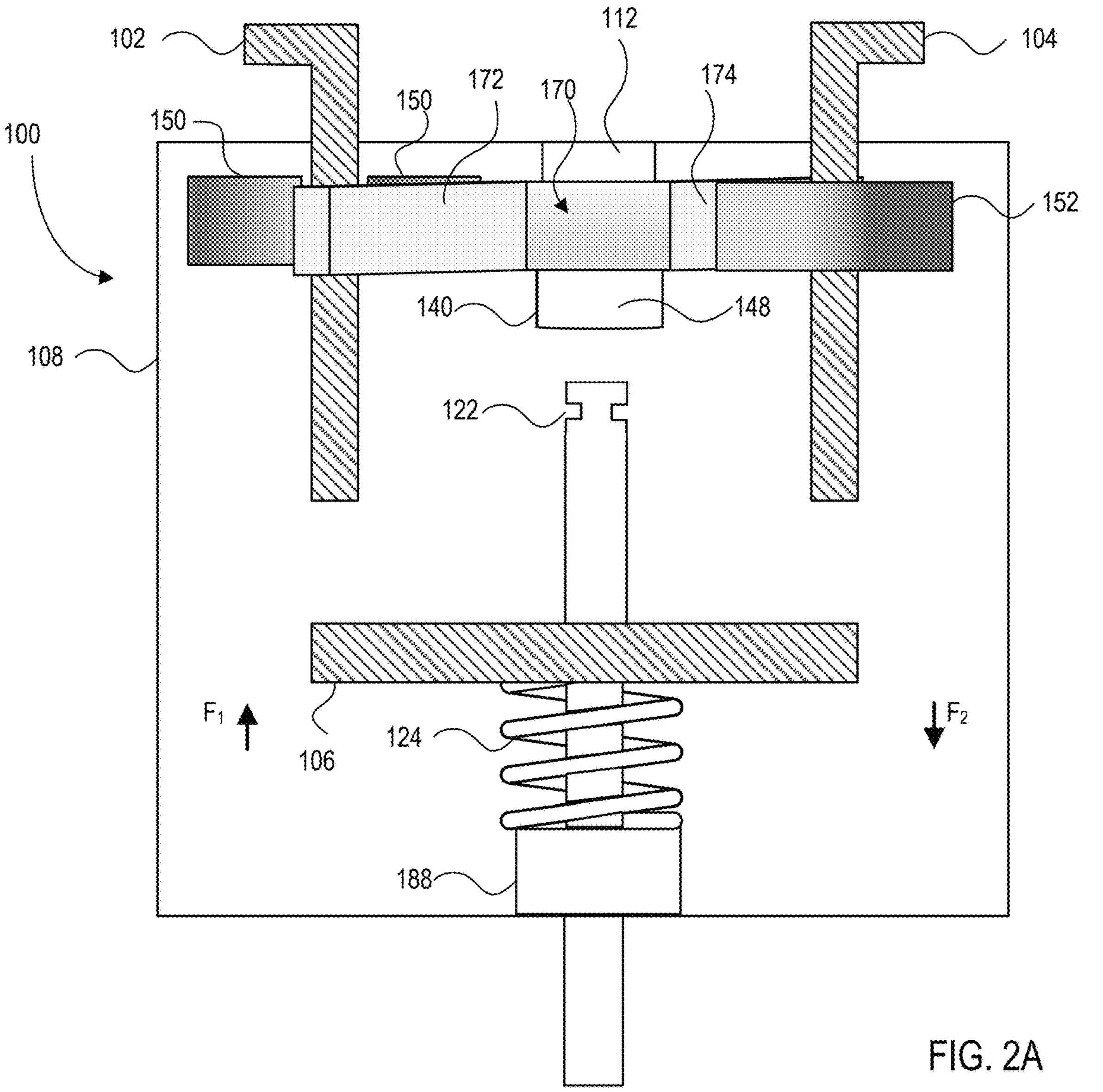
FIG. 2A sets forth a front view of an example device in a triggered state accordance with some embodiments of the present disclosure.
Figure 2B:
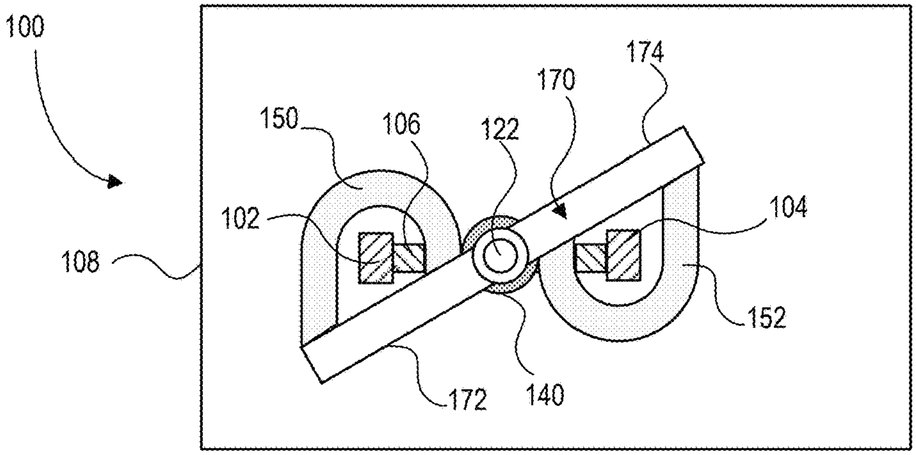
FIG. 2B sets forth atop view of the device of FIG. 2A.

For further explanation, FIG. 2A depicts a font view of the example fuse device 100 in the triggered state and FIG. 2B depicts an overhead view of the example fuse device 100 in the triggered state in accordance with some embodiments of the present disclosure. The electromagnetic field generated by the cores 150, 152, in the presence of the electric current in the fixed contacts 102, 104 that exceeds the predetermined threshold, exerts a magnetic force on the armature 170 that exceeds a force applied by the mechanical resistance member 112. As shown in FIG. 2B, this causes the arms 172, 174 to be drawn to the cores 150, 152, thus reducing the gap 176 by rotation of the armature 170. The rotation of the armature 170 actuates the rotary latch assembly 140, which releases the latch allowing the shaft 122 to disengage with the rotary latch assembly 140. Thus, the potential energy held in the first bias member 124 is released and the movable contact 106 is forced to separate from the fixed contacts 102, 104.

It is understood that while the present disclosure specifically recites electromagnetic embodiments configured to overcome pre-set mechanical forces, other configurations generating a force corresponding to a pre-determined current, such that the force can overcome a pre-determined mechanical force, is within the scope of the present disclosure.

Figure 3:
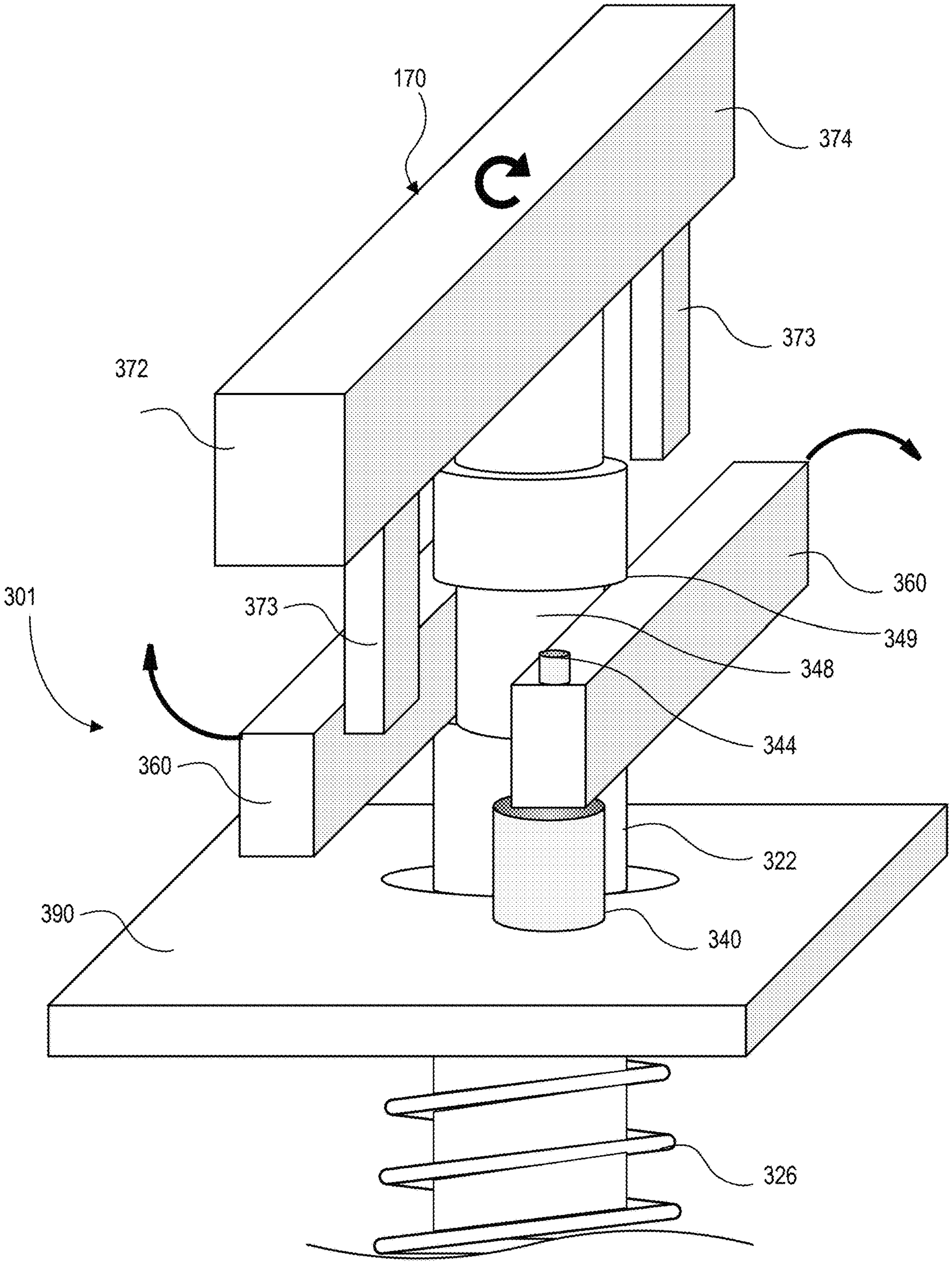
FIG. 3 sets forth detailed view of another example device in accordance with some embodiments of the present disclosure.

For further explanation, FIG. 3 sets forth of a detailed view that includes an example rotary latch assembly 301 in accordance with some embodiments of the present disclosure. In some embodiments, the implementations in accordance with the example rotary latch assembly 301 of FIG. 3 are utilized for the rotary latch assembly 140 in FIG. 1A. The example in FIG. 3 depicts of portion of a shaft 322 of a shaft assembly, which may be similar to the shaft 122 and shaft assembly 120 shown in FIG. 1A. The portion of the shaft 322 depicted in FIG. 3 is shown to illustrate a latching function performed by the rotary latch assembly 301. In some embodiments, the shaft 322 includes at least one notched portion 348. The rotary latch assembly 301 further includes one or more cams 360 that engage the notched portion 348. In some examples, the cams 360 are press fitted or otherwise attached to pins 344 that are slip-flitted into bushings 340, whereby the cams 360 constrain the motion of the cams such that the cams 360 may only rotate concentrically around the bushings 340. The bushings 340 are fixed on a housing wall 390 through which the shaft 322 extends, or some other stationary component of the fuse device. In the set position, or latched state, the cams 360 interface with the shaft 322 at the notched portion 348 to retain the shaft 122 against a bias force F2 provided by a latch spring 326 or other biasing component of the fuse device. For example, the bias force F2 holds a lip 349 of the notched portion 348 against the cams 360. The cams 360 are held against the notched portion 348 of the shaft 322 by a mechanical resistance member such as the torsion spring 342 of FIG. 4. The bias force provided by this mechanical resistance member holds the cams 360 against the notched portion 348 to retain the shaft 322 in the latched position. Thus, in some embodiments, the latch spring 326 may be omitted where another bias member provides the force F2 that disengages the shaft 122 from the rotary latch assembly when the latch is released. In the example depicted in FIG. 3, the latch spring 326 loads the latch assembly with a downward force. When an unlatching event occurs, this potential energy created by the latch spring 326 will pull the moveable contact away from the fixed contacts, thereby causing an interruption event. The latch spring 326 also serves to create a normal force that creates a frictional force between cams 360 and shaft 322.

FIG. 3 also depicts an example armature 370 that includes a first arm 372 and a second arm 374. In some embodiments, the armature 370 is rotatably mounted on the shaft 122. The position such that the armature sits above the notched portion 348 on the shaft. For example, the armature may be supported by a stopper (not shown) or another notched portion of the shaft (also not shown). In some embodiments, the arms 372, 374 include one or more protrusions 373 that extend downward toward the cams 360 and that may engage the cams 360 upon rotation of the armature 370. In the set orientation, or untriggered state, as depicted in FIG. 3, the armature is retained in a position in which the protrusions 373 of the armature 370 do not engage the cams 360. For example, the armature 370 may be retained by a mechanical resistance member (e.g., the mechanical resistance structure 112 of FIG. 1A) such as a torsion spring that provides a bias force. This bias force keeps the protrusions 373 of the armature 370 from engaging the cams 360 until the bias force is overcome by electromagnetic forces acting on the armature 370 to cause rotation of the armature 370. For example, when the electric current in the fixed contacts exceeds a predetermined level, the magnetic field induced in the cores causes rotation of the armature 370 toward the cores in a direction indicated by the rotational arrow. When the protrusions 373 of the armature 370 engage the cams 360 as a result of this rotation, the protrusions 373 exert a force on the cams 360 that is sufficient to overcome the bias force provided by the torsion springs 342. As a result, the cams 360 are swiveled in a direction indicated by the arrows such that the cams 360 disengage the notched portion 348 of the shaft 322, thus releasing the latch on the shaft 322. In one example, the potential energy stored in the latch spring 326 is released when the latch on the shaft 322 is released, thus accelerating the shaft 322 downward and allowing the movable contact to accelerate away from the fixed contacts, thus breaking the circuit. Thus, the forces to be overcome by the armature 370 are generated by the torsion spring 342 on the cam 360, the mechanical resistance member (e.g., torsion spring) on armature 370, and the friction force from latch spring 326.

Figure 4:
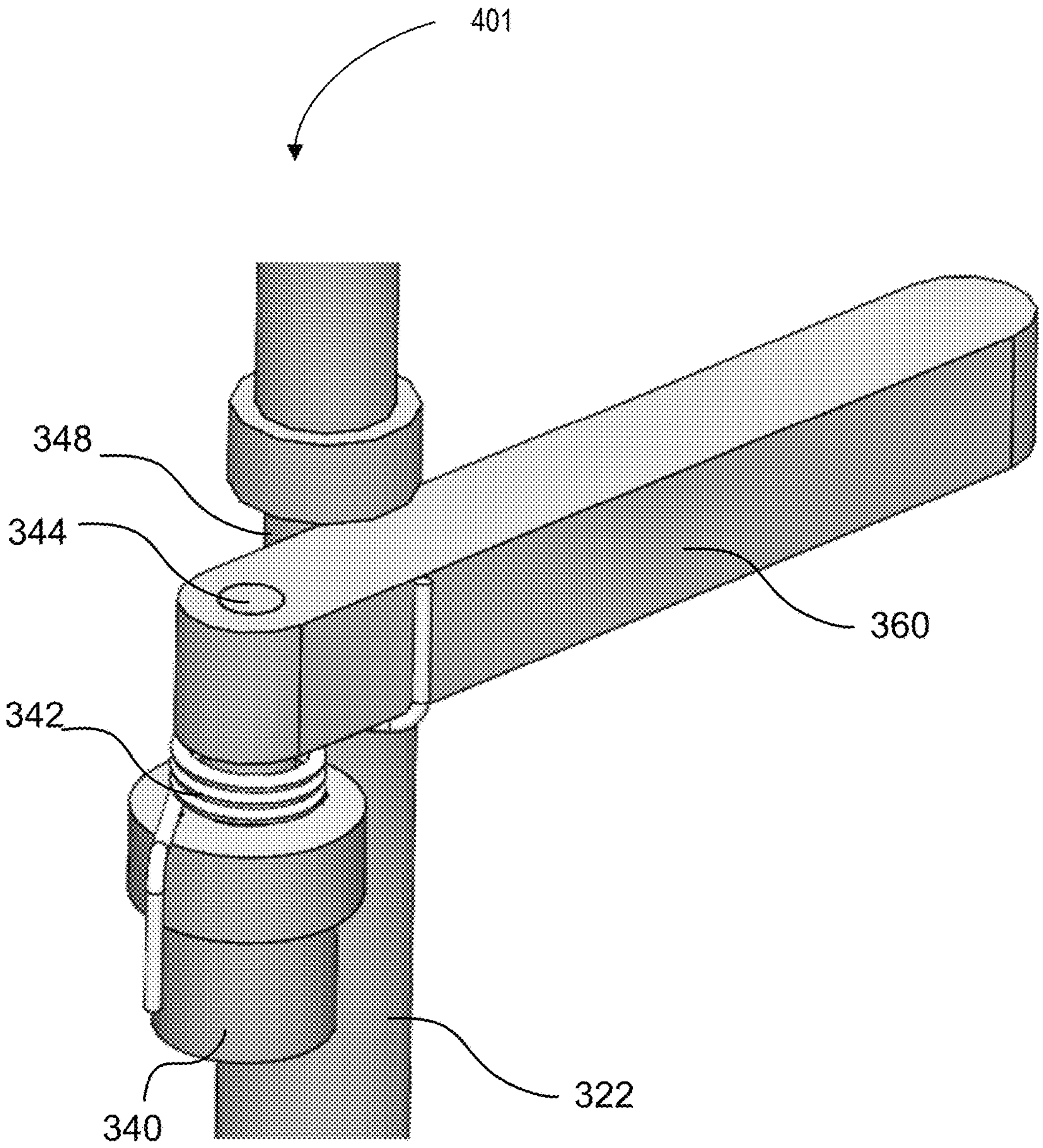
FIG. 4 sets forth another detailed view of an example device in accordance with some embodiments of the present disclosure.

For further explanation, FIG. 4 sets forth of another detailed view that includes an example rotary latch assembly 401 in accordance with some embodiments of the present disclosure. The example of FIG. 4 depicts a cam 360 fixed to a pin 344 that is fitted into a bushing 340. Although not shown, the bushing may be fixed to a portion of the housing (e.g., the housing 108 of FIG. 1A). The cam 360 is depicted in a set, or latched, position in which the cam 360 engages the notched portion 348 of the shaft 322. The cam 360 is held in the latched position by the torsion spring 342. The torsion spring 342 interfaces with the cam 360 and a fixed member such as a portion of the housing (not shown) to hold the cam 360 in place in the latched position. Although elsewhere two cams 360 may be depicted, it will be appreciated by those of skill in the art that the rotary latch assembly may be implemented using only one cam 360, as illustrated in FIG. 4.

Figure 5A:
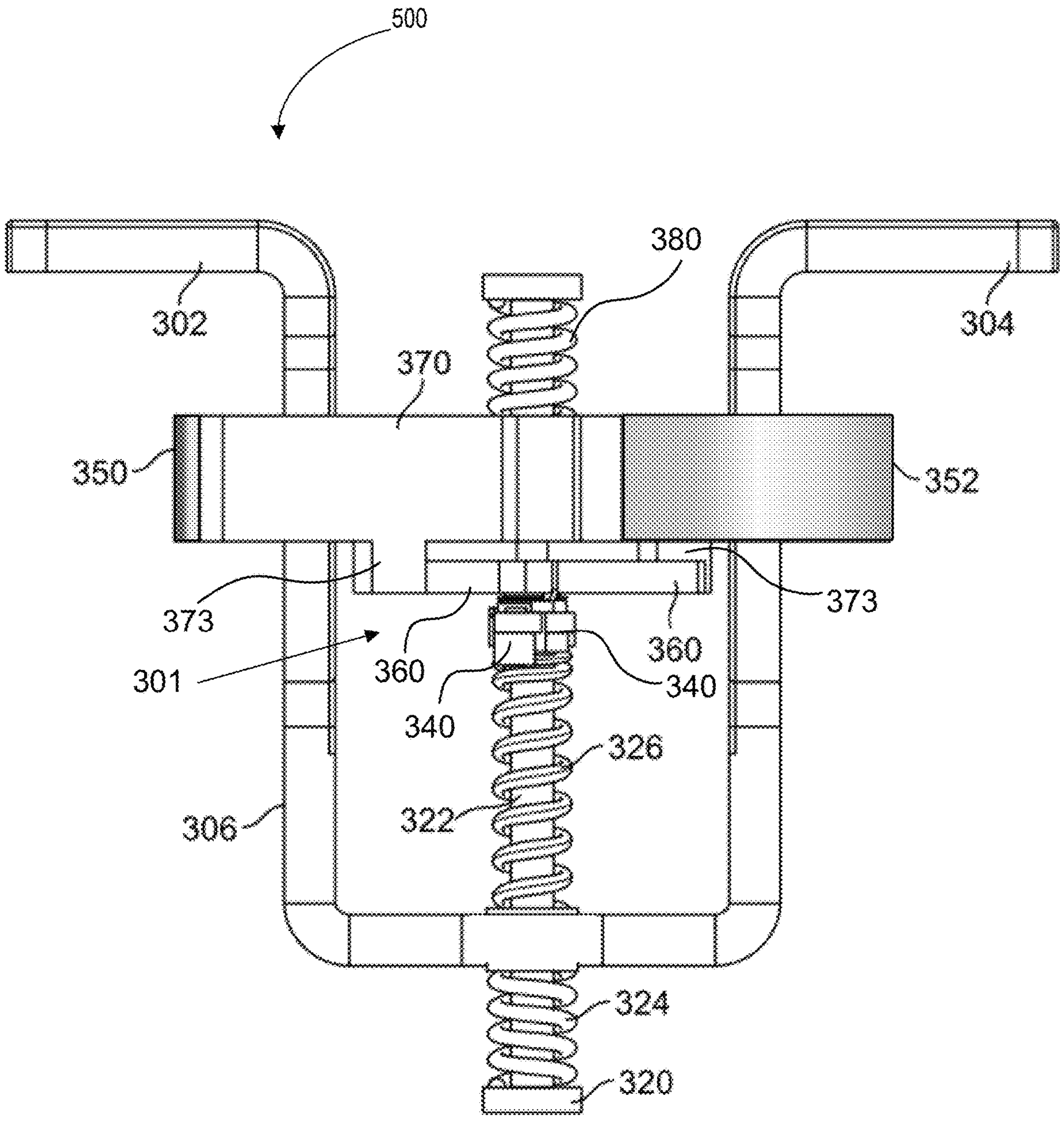
FIG. 5A sets forth a front view of an example device in an untriggered state in accordance with some embodiments of the present disclosure.
Figure 5B:
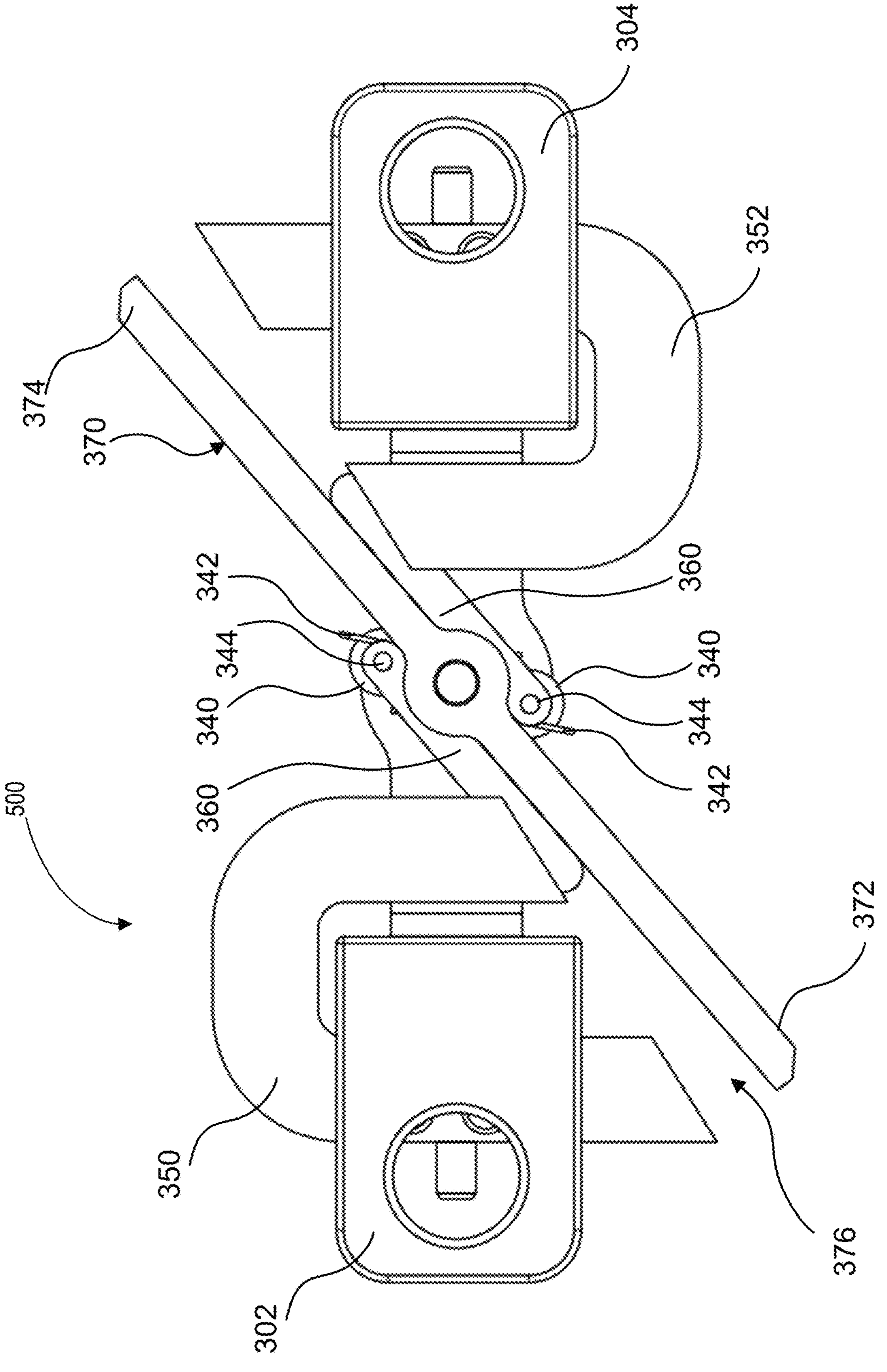
FIG. 5B sets forth atop view of the device of FIG. 5A.

For further explanation, FIG. 5A depicts a font view of an example fuse device 300 in accordance with some embodiments of the present disclosure and FIG. 5B depicts an overhead view of the example fuse device 500 in accordance with some embodiments of the present disclosure. As mentioned previously herein, fuse devices incorporating features of the present disclosure can comprise mechanical features for setting and triggering the fuse device. In the examples shown in FIG. 5A and FIG. 5B, the fuse device 500 is shown in its non-triggered or "set" mechanical orientation. The various non-triggered and triggered orientations will become more apparent as the various drawings are explained in greater detail.

In the example shown in FIG. 5A, the housing of the fuse device 500 is hidden in the view. In some embodiments, the fuse device 500 includes fixed contacts 302, 304 that are disposed partially within a fuse device housing and partially exterior to the housing such that the fuse device 500 may be connected to an electric circuit. The fixed contacts 302, 304 can comprise a conductive material such as copper or other suitable conductive metal or structure. The first and second fixed contacts 302, 304 can be configured such that there is electrical isolation between them, for example, the contacts 302, 304 can be separated by an electrically insulating material or simply by an electrically isolating spatial gap.

The fuse device 500 further includes a movable contact 306 that may be disposed within the compartment of a fuse device housing. When the fuse device 500 is in its set position, the movable contact 306 can be connected to both of the electrically isolated fixed contacts 302, 304, such that the movable contact 306 functions as a bridge allowing an electrical signal to flow through the device, for example, from the first fixed contact 302, to the movable contact 306, to the second fixed contact 304, and vice versa. Accordingly, the fuse device 500 can be connected to an electrical circuit, system or device and complete a circuit while in its set position and when the movable contact is in electrical contact with the fixed contacts.

The movable contact 306 is coupled to the shaft 322, such that the movable contact 306 is held in contact with the fixed contacts 302, 304 when the notched portion 348 of the shaft 322 is latched by the rotary latch assembly 301, as depicted in FIG. 3, in the set orientation. A contact spring 324 is coupled to the movable contact 306 and a fixed member 320 (e.g., a portion of the housing) to bias the movable contact toward the fixed member 320 and away from the fixed contacts 302, 304. In the set orientation, the contact spring 324 is extended thereby loading the spring 324 with potential energy that is released when the shaft 322 is unlatched from the rotary latch assembly 301, thereby accelerating the movable contact 306 out of contact with the fixed contacts 302, 304. In some embodiments, a latch spring 326 is positioned around the shaft 322 between the movable contact 306 and the notched portion 348 of the shaft 322. In the set orientation, the latch spring 326 is compressed thereby loading the latch spring 326 with potential energy that is released when the shaft is unlatched from the rotary latch assembly 301, thereby accelerating the movable contact 306 out of contact with the fixed contacts 302, 304. In some examples, the latch spring 326 is compressed between the movable contact 306 and an interior wall 390 of the housing through which the shaft 322 extends (e.g., a wall of the housing that supports the bushings 340). In further examples, the latch spring 326 is compressed between an interior wall 390 of the housing through which the shaft 322 extends and a stop plate formed around the shaft 322 that is located the housing wall 390 and the movable contact 306. In these embodiments, the compression of the latch spring 326 and/or extension of the contact spring 324 creates a frictional force on the cams 360 as the shaft 322 is pulled down onto the cams 360 at the notched portion 348. As previously mentioned, the latch spring 326 or the contact spring 324 may be coil springs, wave springs, or other such mechanically biasing structures. In some embodiments, the latch spring 326 may be omitted.

The fuse device 500 further includes a two metal cores 350, 352 composed of iron or other suitable metal or alloy capable of producing a magnetic field in the presence of an electric current. In some examples, the cores 350, 352 are U-shaped, such that the fixed contacts 302, 304 pass through (without touching) the cores 350, 352. As illustrated in the example shown in FIG. 5B, the cores 350 in this example are U-shaped. In the presence of an electric current flowing through the fixed contacts 302, 304, the cores 350, 352 function as an electromagnet. In some examples, the cores 350, 352 are supported by the housing (not shown).

The fuse device further includes a rotatable armature 370. In some examples, the rotatable armature 370 includes a center aperture that can receive a shaft 322. In some examples, the armature 370 is composed of a ferromagnetic metal or metal alloy, such as iron, steel, nickel, and the like. In some embodiments, the arms 372, 374 include one or more protrusions 373 that extend downward toward the cams 360 and that may engage the cams 360 upon rotation of the armature 370. In the set orientation, or untriggered state, as depicted in FIG. 3, the armature is retained in a position in which the protrusions 373 of the armature 370 do not engage the cams 360. For example, the armature 370 may be retained by a torsion spring 380. This bias force keeps the protrusions 373 of the armature 370 from engaging the cams 360 until the bias force is overcome by electromagnetic forces acting on the armature 370 to cause rotation of the armature 370. When the fuse device 300 is in the set orientation, or untriggered state, a mechanical gap 376 is maintained between the arms 372, 374 of the armature 370 and the cores 350, 352, as depicted in FIG. 5B.

The fuse device 500 can be configured such that triggering the fuse device 500 by reaching a predetermined threshold current level will generate an electromagnetic field sufficient to overcome the force provided by the torsion spring 380 (or another mechanical structure holding the device in anon-triggered position) and trigger the device. The cores 350, 352, the armature 370, and the torsion spring 380 and/or the various other components of the fuse device 500 can be configured such that when the current through the device reaches a certain predetermined current level, for example, 800 amps, the cores 350, 352 will generate a sufficient magnetic field to cause the armature 370 to overcome the force of the torsion spring 380 and trigger the device.

Once a sufficient electromagnetic force is generated due to the predetermined current value being reached, the fuse device 500 transitions from its set position, wherein the fuse device allows electrical flow through it, to the triggered position, wherein the electrical device breaks the connected circuit. In the embodiment shown, this transition between positions occurs when the generated electromagnetic field causes the arms 372, 374 to become drawn toward the cores 350, 352, for example, to a degree that overcomes the force applied by the torsion spring 380. This at least partially reduces (and can totally eliminate) the mechanical position gap 376 by rotation of the armature 370, which actuates the rotary latch assembly 301 to disengage and release the shaft 322. This causes the movable contact 306 to no longer be restrained, which allows the contact spring 324 to act on the movable contact 306 to change orientation out of contact with the fixed contacts 302, 304 within the fuse device 500 and break the circuit.

Figure 6A:
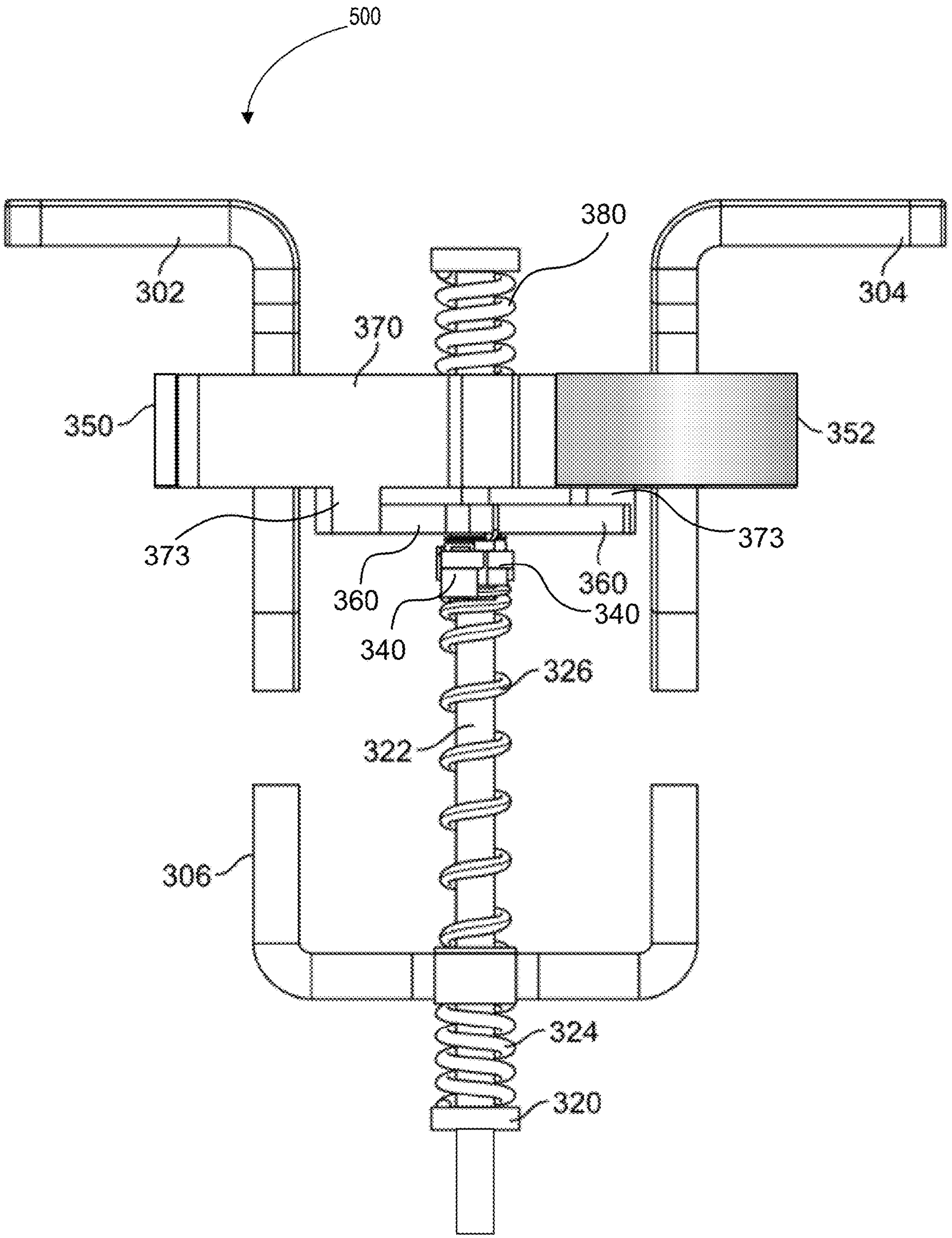
FIG. 6A sets forth a front view of an example device in a triggered state in accordance with some embodiments of the present disclosure.
Figure 6B:
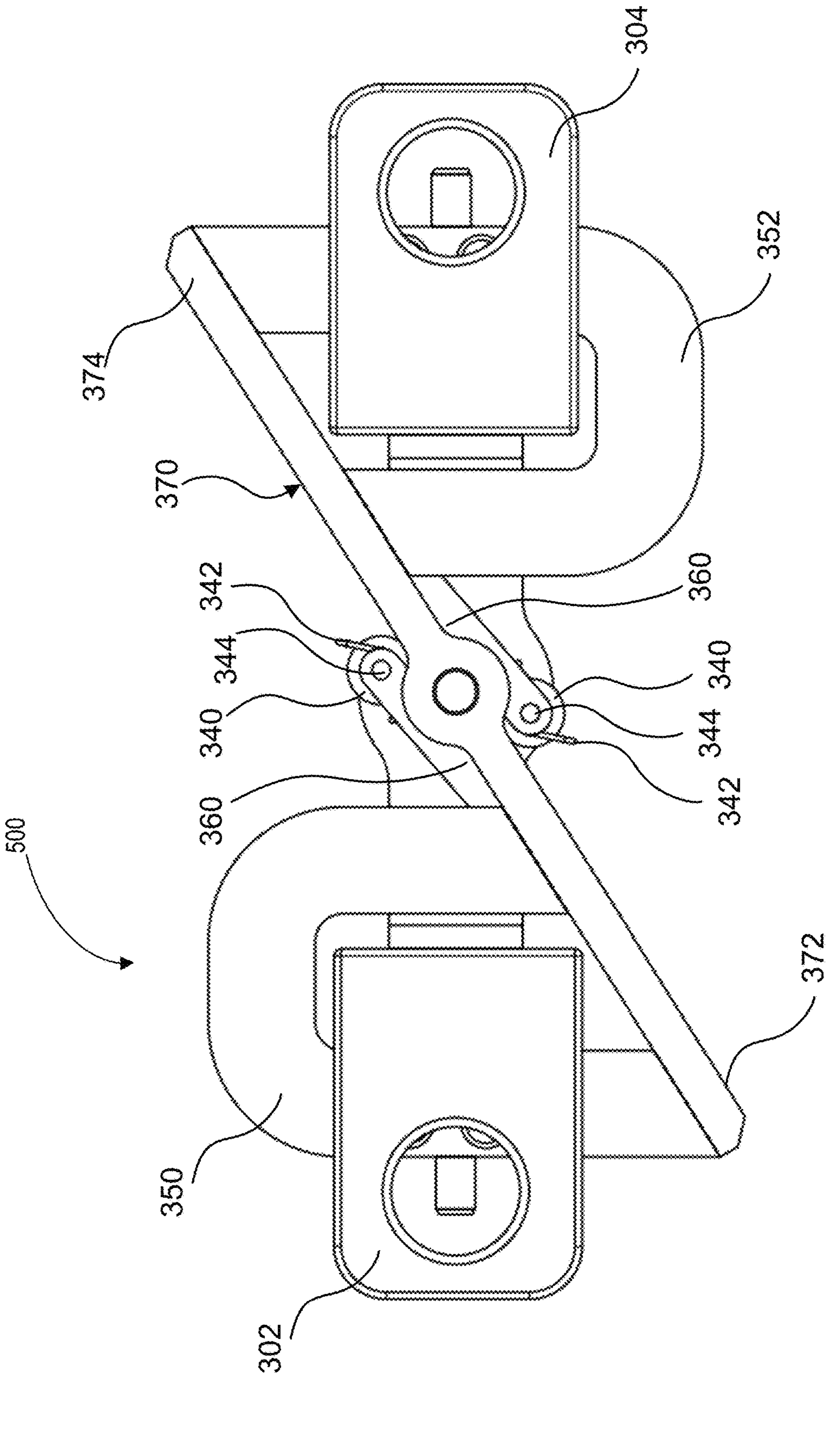
FIG. 6B sets forth atop view of the device of FIG. 6A.

For further explanation, FIG. 6A depicts a font view of the example fuse device 500 in the triggered state and FIG. 6B depicts an overhead view of the example fuse device 500 in the triggered state in accordance with some embodiments of the present disclosure. The electromagnetic field generated by the cores 350, 352, in the presence of the electric current in the fixed contacts 302, 304 that exceeds the predetermined threshold, exerts a magnetic force on the armature 370 that exceeds a force applied by the torsion spring 380. As shown in FIG. 6B, this causes the arms 372, 374 to be drawn to the cores 350, 352, thus reducing the gap 376 by rotation of the armature 370. The rotation of the armature 370 actuates the rotary latch assembly 301, which releases the latch allowing the shaft 322 to disengage with the rotary latch assembly 301. For example, when the electric current in the fixed contacts exceeds a predetermined rating, the magnetic field induced in the cores causes rotation of the armature 370 toward the cores. When the protrusions 373 of the armature 370 engage the cams 360 as a result of this rotation, the protrusions 373 exert a force on the cams 360 that is sufficient to overcome the bias force provided by the torsion springs 342, causing the cams to rotate in the bushings 340. As a result, the cams 360 are swiveled such that the cams 360 disengage the notched portion 348 of the shaft 322, thus releasing the latch on the shaft 322. Thus, the potential energy held in the contact spring 324 is released and the movable contact 306 is forced to separate from the fixed contacts 302, 304.

Figure 7:
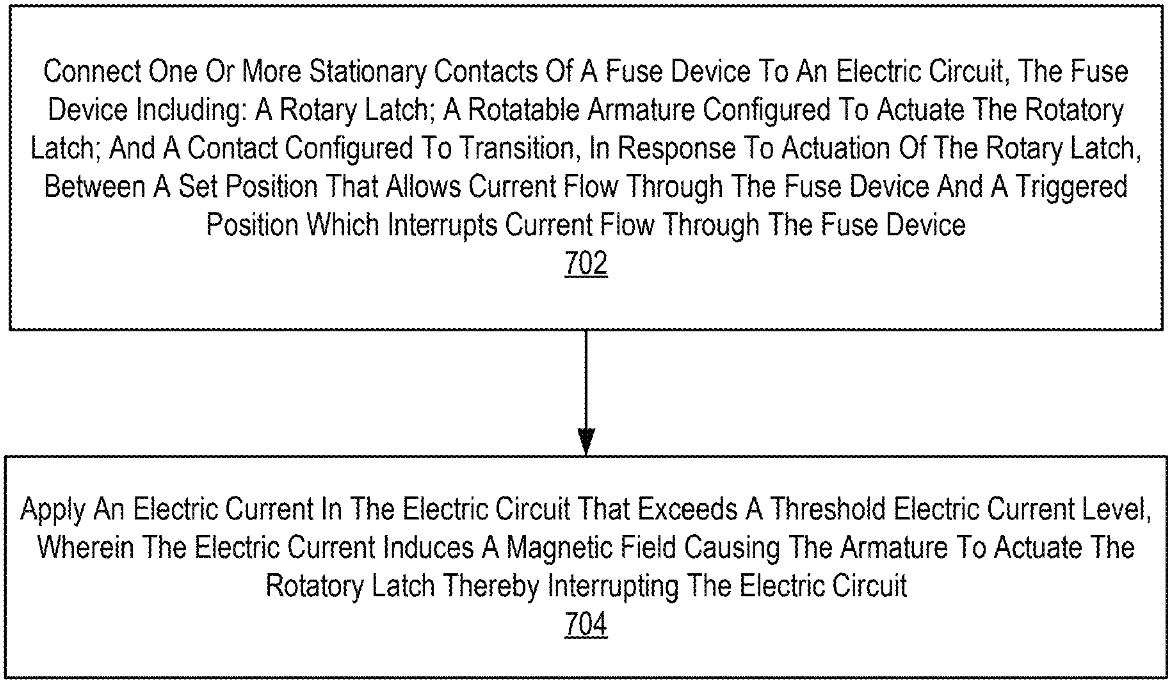
FIG. 7 sets forth a flowchart of another example method of using an electromechanical rotary latch in current interruption devices in accordance with the present disclosure.

For further explanation, FIG. 7 sets forth a flow chart illustrating an exemplary method for using an electromechanical rotary latch in current interruption devices according to embodiments of the present disclosure. The method of FIG. 7 includes connecting 702 one or more stationary contacts of a fuse device to an electric circuit, the fuse device including: a rotary latch; a rotatable armature configured to actuate the rotary latch; and a contact configured to transition, in response to actuation of the rotary latch, between a set position that allows current flow through the fuse device and a triggered position which interrupts current flow through the fuse device. In some examples, connecting 702 one or more stationary contacts of a fuse device to an electric circuit can be carried out by placing any of the above-described fuse devices in an electric circuit. For example, the fuse device may be placed between a battery current source and current-consuming components of an electric vehicle.

The method of FIG. 7 also includes applying 704 an electric current in the electric circuit that exceeds a threshold electric current level, wherein the electric current induces a magnetic field causing the armature to actuate the rotary latch thereby interrupting the electric circuit. In some examples, applying 704 the electric current can be carried out by creating a condition in which the current in the electric circuit, and thus flowing through the fuse device, exceeds a predetermined current threshold at which the fuse device is configured to trigger a current interruption.

In view of the explanations set forth above, readers of skill in the art will recognize that the benefits of an electromechanical rotary latch for use in current interruption devices according to embodiments of the present disclosure include, but are not limited to:

- Devices in accordance with this disclosure do not rely on thermal fuses that are susceptible to thermal fatigue.
- Devices in accordance with this disclosure do not rely on linear electromechanical latching mechanisms that are susceptible to shock or vibration.
- Devices in accordance with this disclosure may utilize a trigger current that is selected independent of resistance to shock and vibration.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A fuse device utilizing an electromechanical rotary latch, the fuse device comprising:

a rotary latch that includes one or more cams each mounted for rotation about a respective fixed bushing rigidly coupled to a housing and biased toward a shaft by one or more torsion springs;

a rotatable armature configured to actuate the rotary latch; and a movable contact assembly having a shaft coupled to a movable contact, the movable contact assembly configured to change between a set position that allows current flow through the fuse device and a triggered position which interrupts current flow through the fuse device;

wherein in the set position, the one or more cams extend radially inward into a continuous circumferential notch recessed in a body of the shaft and bounded by opposed axial walls and a notch bottom, an axial wall of the notch bearing against the cam to mechanically interlock the shaft in the set position;

wherein the fuse device is configured such that when a threshold current level passes through the fuse device, the rotatable armature rotates toward one or more magnetic cores in response to a generated electromagnetic field and via one or more protrusions on the armature engaging the cams, drives rotation of the cams about the fixed bushings against the torsion springs, causing the one or more cams to withdraw radially outward from within the circumferential notch of the shaft, which frees the movable contact assembly to transition to the triggered position.

2. The fuse device of claim 1, wherein the movable contact assembly is biased toward the triggered position, and wherein the rotary latch holds the movable contact assembly in the set position.

3. The fuse device of claim 2, wherein the movable contact assembly is supported by the shaft, and wherein the shaft is latched by the rotary latch to hold the movable contact assembly in the set position.

4. The fuse device of claim 1, wherein the one or more cams are biased against the shaft by one or more torsion springs.

5. The fuse device of claim 1, wherein the armature includes one or more protrusions that engage the one or more cams.

6. The fuse device of claim 3, wherein the movable contact assembly is accelerated toward the triggered position by a latch spring in an unlatched state.

7. The fuse device of claim 1, wherein the rotatable armature is biased from actuating the rotary latch below the threshold current level.

8. An apparatus utilizing an electromechanical rotary latch, the apparatus comprising:

one or more cores disposed within a housing;

one or more fixed contacts disposed proximate to the one or more cores;

a movable contact assembly having a shaft, the movable contact assembly configured to contact the one or more fixed contacts in an untriggered state and to disengage from the one or more fixed contacts in a triggered state; and a rotary latch that includes one or more cams each mounted for rotation about a respective fixed bushing rigidly coupled to the housing and biased toward the shaft by one or more torsion springs and a rotatable armature disposed proximate to the one or more cores, the rotatable armature including one or more protrusions positioned to bear against and rotate the cams upon rotation of the armature, wherein the armature is biased such that the armature and the one or more cores are separated by a gap;

wherein in the untriggered position, the one or more cams extend radially inward into a continuous circumferential notch recessed in a body of the shaft, an axial wall of the notch bearing against the cam to mechanically interlock the shaft, which maintains the movable contact assembly in the untriggered state;

wherein the rotatable armature is configured to rotate toward the one or more cores in response to a magnetic field induced by an electric current in the one or more fixed contacts; and wherein rotation of the armature via the protrusions causes the one or more cams to rotate about the fixed bushings against the torsion springs and withdraw radially outward from within the circumferential notch of the shaft, which frees the movable contact assembly to transition to the triggered state such that contact with the one or more fixed contacts is broken.

9. The apparatus of claim 8, wherein the rotatable armature is biased by a mechanical resistance structure configured to maintain the gap until a threshold current level passes through the one or more fixed contacts.

10. The apparatus of claim 8, wherein the movable contact is biased toward a triggered position, and wherein the rotary latch holds the movable contact in an untriggered position in contact with the one or more fixed contacts.

11. The apparatus of claim 10, wherein the movable contact is acted upon by the shaft, and wherein the shaft is latched by the rotary latch when the movable contact is in the untriggered position.

12. The apparatus of claim 8, wherein the one or more cams are biased against the shaft by one or more torsion springs.

13. The apparatus of claim 8, wherein the armature includes one or more protrusions that engage the one or more cams.

14. The apparatus of claim 10, wherein the movable contact is accelerated toward the triggered position by a latch spring in an unlatched state.

15. A method of using an electromechanical rotary latch in current interruption devices, the method comprising:

connecting one or more stationary contacts of a fuse device to an electric circuit, the fuse device including:

a rotary latch that includes one or more cams each mounted for rotation about a respective fixed bushing and biased toward a shaft by one or more torsion springs;

a rotatable armature configured to actuate the rotary latch via one or more protrusions on the armature that bear against the cams; and a movable contact assembly having a shaft with a continuous circumferential notch recessed in a body of the shaft, the movable contact assembly configured to change between a set position that allows current flow through the fuse device and a triggered position which interrupts current flow through the fuse device;

wherein in the set position, the one or more cams of the rotary latch extend radially inward into the circumferential notch which maintains the movable contact assembly in the set position by mechanical interlock between an axial wall or lip of the notch and the cam;

applying an electric current in the electric circuit that exceeds a threshold electric current level, wherein the electric current induces a magnetic field in cores causing the armature to rotate and, via the protrusions, rotate the cams about the fixed bushings against the torsion springs to withdraw the cams radially outward from the notch, which frees the movable contact assembly to transition to the triggered position.

16. The method of claim 15, wherein the movable contact assembly is biased toward the triggered position, and wherein the rotary latch holds the movable contact assembly in the set position.

* * * * *